(12) United States Patent
Chauhan et al.

(10) Patent No.: US 9,704,168 B2
(45) Date of Patent: Jul. 11, 2017

(54) METHOD AND SYSTEM FOR IMPLEMENTING PROFILES FOR AN ENTERPRISE BUSINESS APPLICATION

(71) Applicant: Oracle International Corporation, Redwood Shores, CA (US)

(72) Inventors: Vikash Chauhan, Fremont, CA (US); Neelesh Gurnani, Foster City, CA (US); Arif Rashid Khan, Aurora, IL (US); Solomon Raja Reddy Yenumula, Andhra Pradesh (IN)

(73) Assignee: Oracle International Corporation, Redwood Shores, CA (US)

( * ) Notice: Subject to any disclaimer, the term of this patent is extended or adjusted under 35 U.S.C. 154(b) by 292 days.

(21) Appl. No.: 14/040,515

(22) Filed: Sep. 27, 2013

(65) Prior Publication Data

US 2014/0095254 A1 Apr. 3, 2014

Related U.S. Application Data

(60) Provisional application No. 61/707,308, filed on Sep. 28, 2012, provisional application No. 61/777,997, filed on Mar. 12, 2013.

(51) Int. Cl.
*G06F 7/00* (2006.01)
*G06F 17/30* (2006.01)
*G06Q 30/02* (2012.01)

(52) U.S. Cl.
CPC ... *G06Q 30/0201* (2013.01); *G06F 17/30569* (2013.01)

(58) Field of Classification Search
CPC .................................. G06F 17/30569
USPC ....................................... 707/809
See application file for complete search history.

(56) References Cited

U.S. PATENT DOCUMENTS

| | | | |
|---|---|---|---|
| 2004/0034537 A1* | 2/2004 | Gengarella | G06Q 30/02 705/5 |
| 2004/0148305 A1* | 7/2004 | Bollich | G06F 17/30569 |
| 2008/0288484 A1* | 11/2008 | Bouzid | H04L 67/303 |
| 2014/0278620 A1 | 9/2014 | Khan et al. | |

* cited by examiner

*Primary Examiner* — Sujay Koneru
(74) *Attorney, Agent, or Firm* — Vista IP Law Group, LLP

(57) ABSTRACT

Methods and systems for implementing extensible profiles for enterprise applications. Users of the system are able to continuously extend their contact model by adding additional attributes or by adding related custom objects over a period of time. This permits the users of the system to adapt to changing circumstances and needs. Web services are able to perform operations on the extended attributes and objects through the use of profile adapters. Some embodiments also provide the ability to capture data from various sources, such as web surveys, data imports, and web services and write it to the extended attributes/objects.

27 Claims, 12 Drawing Sheets

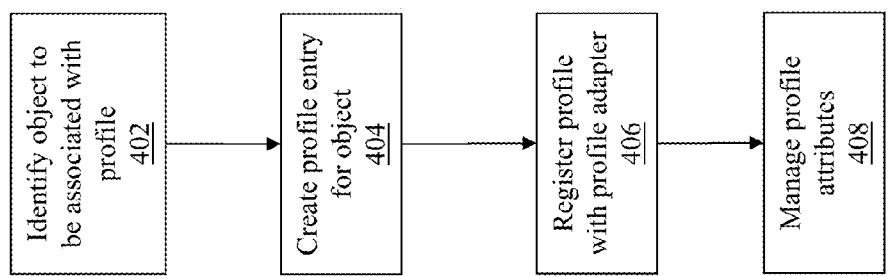

List of Profile Attributes

FIG. 5

METHOD AND SYSTEM FOR IMPLEMENTING PROFILES FOR AN ENTERPRISE BUSINESS APPLICATION

CROSS-REFERENCE TO RELATED APPLICATIONS

The present application claims the benefit of priority to U.S. Provisional Patent Application Ser. No. 61/707,308, entitled "Method and System for Implementing Profiles for an Enterprise Business Application," filed Sep. 28, 2012, and U.S. Provisional Patent Application Ser. No. 61/777, 997, entitled "Method and System for Implementing Profiles for an Enterprise Business Application," filed Mar. 12, 2013, both of which are hereby incorporated by reference in their entireties.

BACKGROUND

The present application relates to software development and more specifically to systems, methods, and patterns for implementing enterprise software applications.

Many types of business logic are implemented by enterprise software applications. For example, many enterprise applications are focused on business logic to perform marketing or customer relations management (CRM) tasks. Examples of such business logic includes tools that facilitate web-based customer surveys, sales, and order capture.

The problem that is often faced by users of such systems is that these enterprise software systems do not come with a standard configuration that exactly meets the user's requirements, can be managed directly by business users, and does not require offline customizations to the software code. This means that the out-of-the-box performance of the system does not provide the most optimal, useful or effective configuration for the user. Given the complexity of these systems, it is normally very difficult, if not impossible, for most users to be able to configure the system to meet the user's requirements.

Therefore, there is a need for an improved approach to implement enterprise software systems that address these and other problems.

SUMMARY

The present application provides an improved approach to implement enterprise applications. In some embodiments, the present invention provides a mechanism that allows users of the system to continuously extend their contact model by adding additional attributes or by adding related custom objects over a period of time. This permits the users of the system to adapt to changing circumstances and needs. Some embodiments of the invention also provide the ability to capture data from various sources, such as web surveys, data imports, and web services and write it to the extended attributes/objects. Therefore, the embodiments of the invention provide the ability to read data from extended attributes/objects without the need for a major development effort. The various embodiments illustrated below may be specifically described with respect to marketing applications, but it is noted that the invention is applicable to any business application and is not limited in its scope just to marketing applications.

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of CRM applications. It is noted, however, that the invention is not limited in its scope to CRM applications, and indeed, may be applied to other types of applications as well.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

FIG. 4A illustrates a flowchart of a process for setting up a profile in accordance with some embodiments.

FIG. 5 illustrates an interface that shows a listing of possible attributes for a contact model in accordance with some embodiments.

DETAILED DESCRIPTION

Data used for performing marketing and business logic, such as customer surveys, sales, and order capture, may be organized using various objects and data structures as part of an organization's contact model. The objects/data structures may correspond to, for example, sales or marketing contacts. From a marketing product standpoint, it is required to allow users of the software tool to be able to extend their contact model over a period of time and add these extensions quickly without any changes to the underlying application code, or which require back end metadata that controls the application (i.e. metadata that only the IT department/specialists can change). This is required in order to adapt to changing circumstances and needs. The users also need an ability to capture data from various sources and write it to the extended attributes/objects of the contact model, with the ability to read data from extended attribute/objects without the need for a major development effort.

Figure 1:
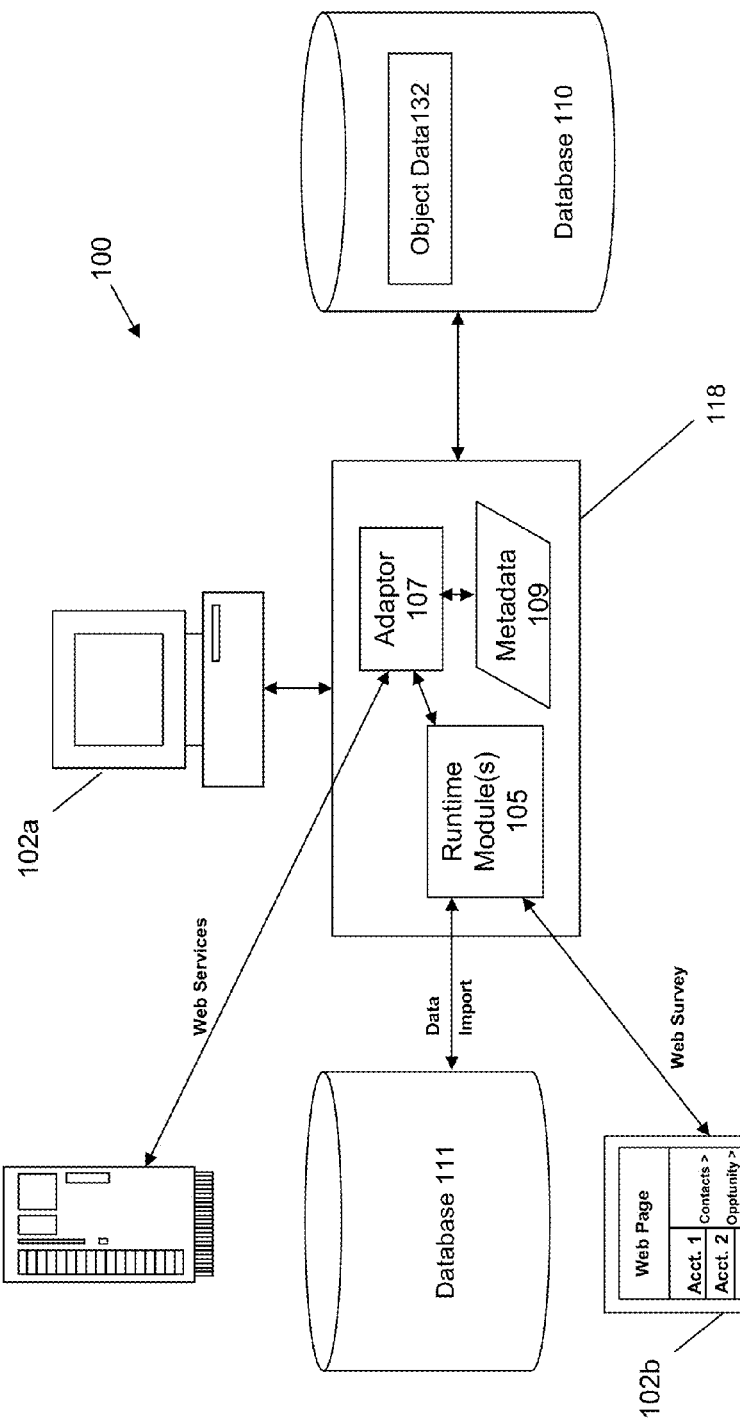
FIG. 1 illustrates an architecture of a system according to some embodiments.

Embodiments of the invention provide an improved approach for implementing enterprise software systems that addresses the above-described problems with existing systems. FIG. 1 shows an architecture of a system 100 according to some embodiments of the invention. System 100 may include one or more users at one or more user stations 102a, one or more tablet devices 102b, or any other device that may be useful to access an enterprise computing system, e.g., such as one or more mobile computing or telephony devices.

In system 100, user station 102a comprises any type of computing station that may be used to operate or interface with a server 118. Examples of such user stations 102 include for example, workstations, personal computers, laptop computers, or remote computing terminals. Tablet device 102b comprises any type of portable tablet device, including for example, tablet computers, portable readers, etc. Mobile devices comprise any mobile device that can suitably access an application on application server 118, such as smartphones and programmable mobile handsets. User station 102a, tablet device 102b, and mobile devices usually include a display device, such as a display monitor or screen, for displaying scheduling data and interface elements to users. User station 102a, tablet device 102b, and/or mobile device may also comprise one or more input devices for the user to provide operational control over the activities of system 100, such as a mouse, touch screen, keypad, or keyboard. The users may correspond to any individual, organization, or other entity that uses system 100 to remotely access applications on application server 118, such as a CRM application on application server 118.

The users operate the system 100 to access and utilize applications on an application server 118 to perform any activities operable using the application server 118. For example, the server 118 may implement a web marketing application that is directed towards facilitating marketing activities over the internet. The marketing activities include, for example, managing and implementing marketing campaigns over web-based mediums such as email, social media, and company-sponsored web pages. The marketing activities may involve implementation of web forms and web surveys that provide marketing information to consumers, and which also obtain information from the consumer when the forms and surveys are filled out.

The server 118 may also function to directly import marketing-related data from an external data source, such as a database 111. In addition, web services may be employed to directly access and perform activities on the server 118.

According to some embodiments of the invention, when the user accesses an application (e.g., CRM or web marketing application) on application server 118, the application server 118 will access one or more items of object data 132 at database 110. The database 110 corresponds to any type of computer readable mediums or storage devices. The computer readable storage devices comprise any combination of hardware and software that allows for ready access to the data within database 110. For example, the computer readable storage device could be implemented as computer memory or disk drives operatively managed by an operating system.

The server 118 in the present embodiment provides an improved approach to implement enterprise applications, where a mechanism is provided that allows users of the system to continuously extend their contact model by adding additional attributes or by adding related custom objects over a period of time, permitting the users of the system to adapt to changing circumstances and needs.

Each of the data objects is associated with respective metadata 109. The metadata 109 for an object includes information about the attributes for that object. Therefore, any changes, additions, or modifications to an object can be performed by modifying the metadata 109 associated with the object. The metadata 109 is also responsible for mapping the attributes of an object to its underlying data 132 in the database 110.

One or more adapters 107 are provided to access the data objects in the system. The adapters include the logical intelligence that permits external entities to read from or write to the object data. The adapter 107 utilizes the metadata 109 to provide this ability to access the underlying data.

Runtime modules 105 use the one or more adapters 107 to access the data objects. For example, to implement web surveys, a web survey runtime module is employed that utilizes the adapter 107 for its respective data. Similarly, to implement data imports from database 111, an import runtime module is employed that utilizes the adapter 107 (possibly the same adapter) to access the underlying data objects. Web services would likely not need the runtime module 105, but would instead directly access the adapter 107 to write to and read from the underlying data objects.

Therefore, this embodiment of the invention provides the ability to capture data from various sources, such as web surveys, data imports, and web services and write it to the extended attributes/objects. Since the objects are definable and extendable by modifying the metadata 109, this means that the embodiments of the invention provide the ability to read data from extended attribute/objects without the need for a major development effort.

Figure 2:
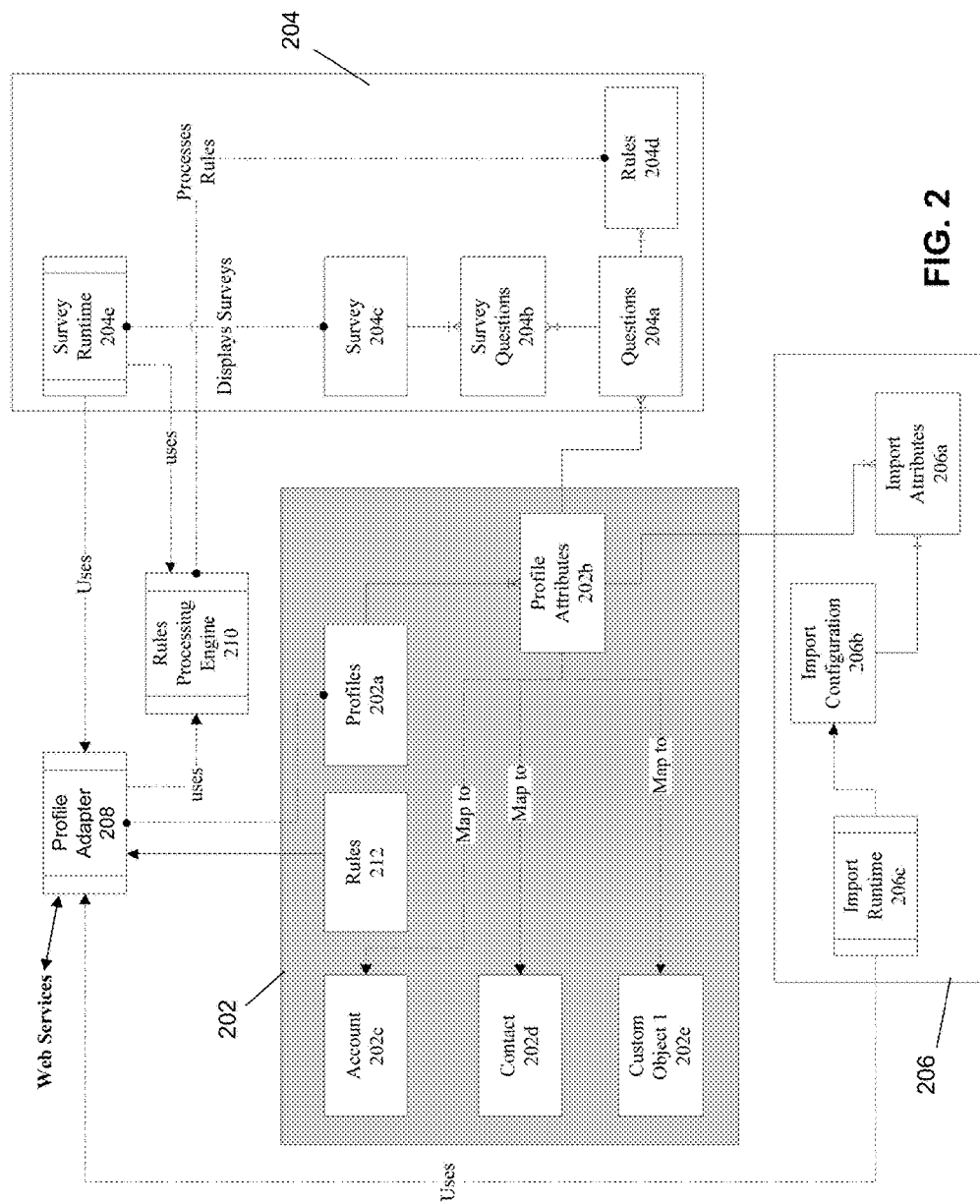
FIG. 2 illustrates a system for implementing contact model profiles in accordance with some embodiments.

FIG. 2 provides a more detailed illustration of some embodiments of the invention directed to contact models (although this architecture is applicable to other types of models as well). Each contact model object that can be read from and written to is modeled as a "profile."

Box 202 illustrates the metadata components used to define the profiles. Profiles 202a represent the contact model objects that may interact with web services through one or more profile adapters 208. Each profile 202a is associated with one or more profile attributes 202b. The profile attributes 202b map to the underlying data objects/structures of profile 202a. These objects/structures may be implemented, for example, as entries in a set of underlying database tables. In some embodiments, multiple tables may be joined together for each object.

In the illustrated embodiment, the attributes 202b of the profiles 202a map to an account object 202c, a contact object 202d, and a "custom object 1" 202e. In some embodiments, custom objects may also be child objects of other objects (e.g., contact object). Examples of custom objects may include what products a contact has purchased in the past, current service contracts associated with a contact, etc.

The profiles 202a may also specify metadata for the attributes 202b associated with the objects. For example, the account object 202c may have an "account type" attribute that must be a text string, and an "account number" attribute that must be a number. Some objects may be required to have certain attributes. For example, the contact object 202d may be required to be associated with a "first name," "last name," and "email address" attributes.

The contact models can be extended by adding to the profile attributes 202b. In addition, custom objects can also be added merely by updating the metadata for the profile 202a to be associated with the new custom object. If one extends the underlying object (e.g., by adding a field to underlying object), the profile adapter 208 associated with the object detects those extensions and starts supporting operations on them. In this way, the enterprise can extend the target object model (e.g., for any suitable business reasons). This also allows the users to further extend and use those attributes in a way that is specific to marketing.

Each profile has an associated profile adapter 208 that knows how to read and write data from/to that profile. In some embodiments, each profile 202a has its own profile adapter 208. In other embodiments, multiple profiles 202a with the same or similar attributes may share a profile adapter 208.

The system uses the profile adapter 208 to conduct operations on the profile 202a. The profile adapter 208 serves as a single point of contact for all services accessing the profile 202a that it is associated with, insulating the various services from having to make changes whenever the format of a profile is modified or changed. For example, runtime modules would use the profile adapter 208 to access the underlying data associated with the profile 202a. Web services could be configured to directly access the profile adapter 208 in order to access the underlying data. The profile adapter 208 knows about the underlying data objects due to its access of the profile metadata, and hence knows how to access that underlying data (e.g., the attributes of account object 202c, contact object 202d, and/or custom objects 202e). This permits the profile adapter 208 to expose the underlying data to data requestors (e.g., web services) that seek to read from or write to that data.

In some embodiments, a profile adapter 208 is a custom adapter for a specific profile 202a (e.g., one profile adaptor is used for account profiles, while another profile adaptor is used for contact profiles). In alternate embodiments, the profile adapter 208 can be configured such that it is applicable to multiple profiles 202a. This configuration can be implemented, for example, by having profiles with a common set of fields/attributes that can be used for multiple purposes. For example, two profiles may both have the same attribute structure that includes the same generic "Boolean" attribute, but a first application of that profile uses the Boolean attribute for a first purpose and the second application of that profile uses the Boolean attribute for a second purpose. However, since both profiles have the same structure, the same base adapter is usable to access the two profiles.

To support a new object, the only thing that is required is to create the metadata for that object. In some embodiments, if the underlying tables for the new object are different from the tables associated with other profiles, then a new profile adapter may be created for that object. However, if the table has the same structure (e.g., there is a standard table format for custom objects and a new custom object is created having that format), then a new profile adapter may not need to be created. The profile attributes correspond to the attributes for the new object. This permits the system to be fully extensible, since a new attribute is creatable merely by adding to the profile attribute metadata. In addition, new objects are creatable by adding new profile entries to the profile metadata. The profile adapter accesses the metadata for the profile to understand how to access the object. The profile adapter may be implemented, for example, using Java programming code. As noted above, the system can also auto-detect extensions to the object itself and propagate those extensions up into the profile and to the profile adapter.

The underlying data of the profiles may be accessed by a variety of different web services. In some embodiments, web services may be used to perform CRUD operations (create, read, update, delete) operations on the underlying data of the profiles. However, the web services do not interact with the profiles directly. Instead, they interact with the profile adapter associated with the profile in order to access and manage the underlying data of the profile.

Services that make use of profile adapter 208 to access the profiles 202a may include a web form or web survey service. In many marketing applications, a web form or survey may be presented to a customer, supplier, or other entity to be filled out, the responses which may be used to automatically populate the attributes of a profile 202a through a profile adapter 208. Box 204 illustrates example structures that can be used to implement a web form or web survey. One or more questions 204a are created or maintained that correspond to attributes whose metadata is stored in profile attributes 202b, where the questions relate to different ways to ask for the profile data. The profile attributes 202b associated with the questions 204a may be retrieved through the profile adapter 208. In some embodiments, the association is done by using foreign keys between a profiles attributes table in profile attributes 202b and the questions 204a. For example, a question may ask "What is your account type?" and be mapped to a "type" attribute of the account object 202c, so that an answer received by the user will be stored under the "type" attribute for the profile. Certain ones of the questions are selected to be the set of one or more survey questions 204b that are actually used in the survey 202c.

In addition, the survey questions 204b may be associated with one or more processing rules 204d in a rulebase. The rules 204d pertain to the way in which the survey implements or processes the survey questions. The rules may determine which of the questions are mandatory, which questions are voluntary, how to handle responses to questions, and the ordering in which the questions are asked. For example, a rule may specify that a question pertaining to a "contact email address" is mandatory, while a question pertaining to a "contact home phone number" is optional. In some embodiments, rules may also specify relationships between questions. For example, a rule may specify that if an answer to a question pertaining to "country" is "USA," then a question pertaining to a "state" attribute will be asked, while if the answer to the "country" question is "Canada," a question pertaining to "province" may be displayed instead.

A survey runtime module 204e implements the survey, by presenting the survey questions and capturing the data input by the user. The survey runtime module uses the profile adapter 208 to interact with the profiles 202a to access and push data into the underlying data structures. In addition, the survey runtime module 204e uses the rules processing engine 210 to process the survey rules 204d.

In some embodiments, data for profiles may be imported from existing files or data sources. Box 206 illustrates example structures that can be used to perform importation of data. This is to implement functionality to import (e.g., a bulk import) data from an external data store or database into the system. As shown in box 206, the import attributes 206a pertain to the attributes for the data to be imported. These import attributes 206a are associated with attributes in profile attributes 202b as identified in the profile metadata retrieved through the profile adapter 208. In some embodiments, this is done using foreign keys between the profile attributes 202b and the import attributes 206a. The information for the import attributes 206a is used to set up the import configuration 206b, which may also contain rules and parameters used by the import runtime module 206c to perform the importation activities. Once the import configuration 206b specifying how the import attributes 206a correspond to profile attributes 202b has been created, the import runtime module 206c uses the profile adapter 208 to perform its importation activities to read from and write to the profiles 202a.

The profile adapter 208 itself may directly use the rules processing engine 210 in its handling of the profile objects. One or more rules 212 may be established for some or all of the various data items and entities associated with the profile. The rules include, for example, configurable read rules and write rules. The read/write rules can be configured to specifically control how objects and attributes are created, modified, and deleted. For example, the rules may control which attributes associated with a given profile can be edited during modification of the profile, who may perform the modification, and how those modifications are to be performed. During operation of the profile adapter, the relevant rules will be accessed and processed by the rules processing engine 212 to control the profile adapter's handling of the objects.

It is noted that the rules engine 212 may be implemented as a generic engine for handling rules by any number of components in the system. For example, response handling may be implemented using the rules engine and associated rules by any component in the system, such as the profile adapter, import runtime, or other components shown in the figure. In some embodiments, different rules processing engines may be used by the profile adapter 208 and the various services (e.g., survey service 204, data import service 206, etc.).

Figure 3:
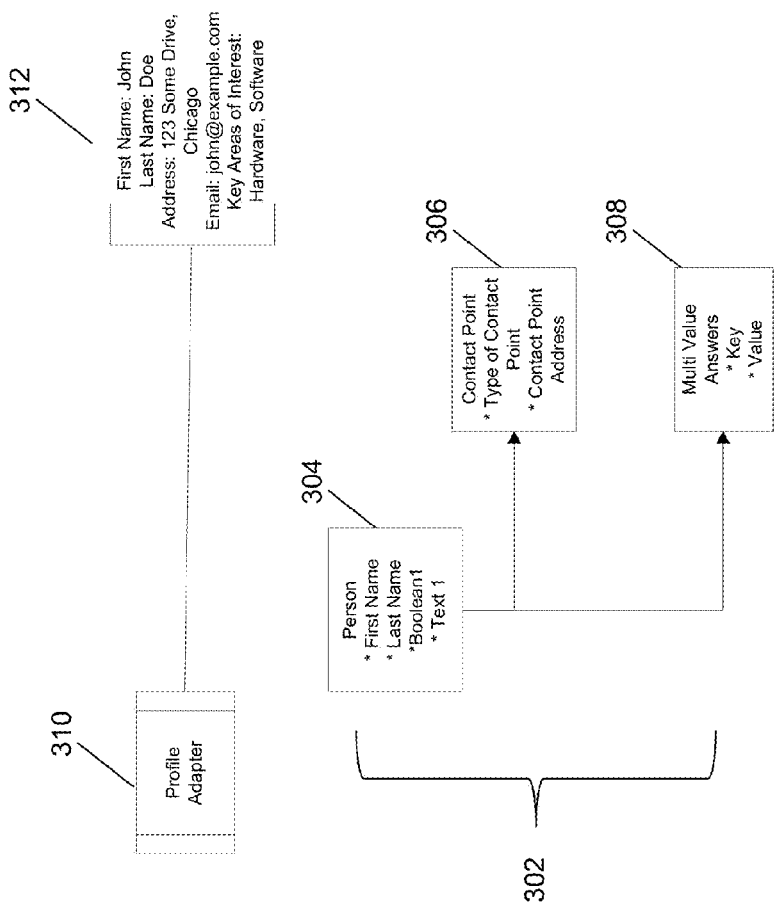
FIG. 3 illustrates importing data into a profile in accordance with some embodiments.

FIG. 3 illustrates the data fields for an example profile 302. The profile 302 includes a person object 304 that is related to both a contact point object 306 and a multi-valued answers object 308. The person object 304 comprises a first name field, last name field, Boolean field, and text field. The contact point object 306 comprises a type of contact point field, and contact point address field. The multi-valued answer object 308 comprises a key field and a value field.

Each of these objects and related field for the profile are captured as profile metadata that identifies the profile attributes for the profiles. The profile metadata is accessed by the profile adapter 310 to permit access to the profile 302. When new data 312 is received that is to be written to the profile, such as through a data importation process or through survey answers, the profile adapter 310 will use the mappings in the profile metadata to write the appropriate portions of the data to the correct underlying data structures. In this case, the first name "John" and last name "Doe" are written to the person object 304. The address and email data are written to the contact point object 306, wherein "address" and "email" are written to the "type of contact point" attribute, and the actual values written to the "contact point address" attribute. The other information pertaining to the key areas of interest are written to the multi-valued answers object 308. For example, "areas of interest" may be written to the "key" attribute, while "hardware" and "software" are written to "value" attributes.

FIG. 4A illustrates a flowchart of a process for setting up a profile in a contact model, in accordance with some embodiments. First, at 402, an object may be identified to be associated with a profile. For example, a profile may be associated with an account object, contact object, or a custom object. At 404, profile entries may be created for the object in the profile metadata, which specifies the different types of objects associated with the profiles.

At 406, the profile is registered with a profile adapter. This allows the profile adapter to know what object is associated with the profile, and will be able to access the object and its attributes when interfacing with one or more web services. The profile adapter acts as an interface for various services that wish to access the profile. When the format of objects or attributes of the profile change (e.g., adding a new attribute to an object), the profile adapter will be able to know by reading the profile metadata.

At 408, profile attributes may be created and/or managed. In addition to defining the attributes to be associated with the profile and mapping them to the underlying object, this may involve identifying one or more attribute level rules that specify how attributes may be created, updated, and/or deleted.

Figure 4B:
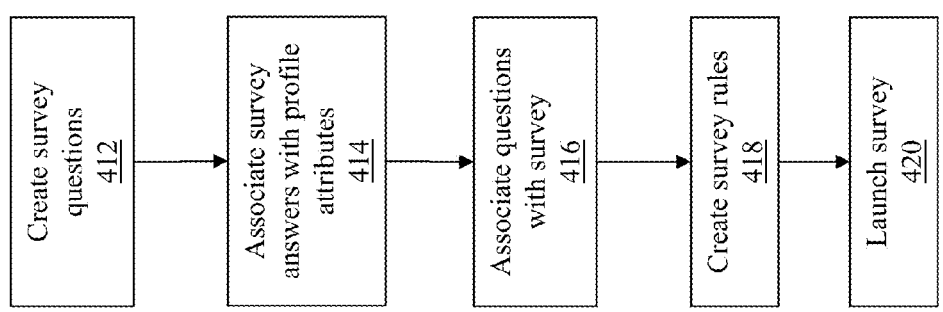
FIG. 4B illustrates a flowchart of a process for setting up a survey in accordance with some embodiments.

FIG. 4B illustrates a process for setting up a survey or form (hereinafter, collectively, survey) in accordance with some embodiments. At 412, one or more survey questions may be created. The survey questions may be labels for fields in which text or numbers may be entered (e.g., "Name:") or actual questions (e.g., "What is your name?", "Who is the primary contact?").

At 414, the survey questions are associated with one or more profile attributes. For example, a question pertaining to a contact email address may be associated with an "email address" attribute of the contact profile. In some embodiments, a single question may be associated with more than one profile attribute. For example, a question pertaining to email address may be associated with a contact point object with a "contact type" attribute and "contact value" attribute (see FIG. 3 above). In such a case, the contact type may be automatically specified as "email" when an answer for the question is received, with the actual answer being stored to the "contact value" attribute. In some embodiments, a profile attribute may be associated with multiple questions. Similar attributes in different objects may require separate questions, but the questions may have the same or similar question text. At 416, one or more of the survey questions are selected to form a survey.

At 418, rules may be identified or created for the survey. For example, the rules may specify some questions as mandatory and other questions as optional. In some embodiments, rules may specify relationships between different questions and how answers to certain questions may be handled, such as skipping or branching options. For instance, if a question for "project budget" is answered, then a question for "project timeline" will be displayed or made mandatory, whereas the "project timeline" question will not be displayed or will remain optional if the "project budget" question is not answered. In some embodiments, the answer to one question may determine the next question to be asked.

Rules may also be made to specify different conditions for displaying questions. For example, a rule may specify that if a user answering questions for a certain profile has answered a question regarding that profile within the last two weeks, then the same question need not be displayed again as part of the survey. Or if a question has not been answered in a certain amount of time, it may be made mandatory instead of optional. Once survey rules have been finalized, the survey may be launched at 420.

Figure 4C:
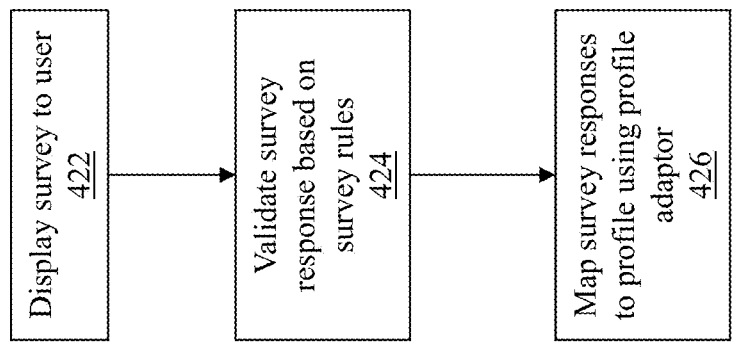
FIG. 4C illustrates a flowchart of a process for running a survey in accordance with some embodiments.

FIG. 4C illustrates a flowchart for a survey runtime in accordance with some embodiments. At 422, the survey is displayed to a user. The user may be a customer, prospective customer, associate, representative, or any other entity that may fill out a survey or form. The survey may be displayed on a web browser or display window on a user station, tablet device, or mobile device. In some embodiments, all questions in the survey may be displayed at once. In other embodiments, questions may be displayed one at a time or in batches. In some embodiments, the profile adapter may be used to pre-populate data in the survey. For example, if data corresponding to attributes associated with the survey questions already exists in the profile (due to being previously imported or answered by the user), the data may be retrieved from the profile through its associated profile adapter and pre-populated in the survey form.

At 424, answers for the survey questions from the user are received. In some embodiments, the received answers may be validated against one or more survey rules using the profile adapter and the rules processing engine. For example, a question pertaining to a "phone number" attribute may only accept answers that follow a specific format. A question pertaining to a "state" attribute many only be able to accept answers that are actual states of the United States. In some embodiments, responses that do not adhere to the survey rules are discarded. In other embodiments, the user may be given an additional opportunity to enter a new answer. In some embodiments, responses may be automatically formatted in accordance with predefined rules in order to adhere to the format requirements of the attribute associated with the survey question. At 426, the survey responses are mapped to profile attributes through the profile adapter.

Figure 4D:
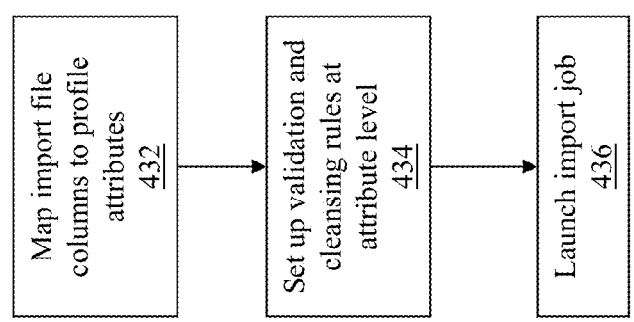
FIG. 4D illustrates a flowchart of a process for setting data importation in accordance with some embodiments.

FIG. 4D illustrates a flowchart of a data import setup process in accordance with some embodiments. At 432, attributes or columns of the import files are mapped to profile attributes. The mapped profile attributes may be from different profiles in a contact model. For example, a data import file may contain fields, attributes or columns for "first name," "last name," "email address," and "account type." These may map to a "first name," "last name," and "email address" attributes of a profile associated with an contact profile, and a "type" attribute of profile associated with an account profile. In some embodiments, it may be possible for a single import attribute to map to more than one profile attribute, or vice versa. For example, an "area code" and a "phone number" attribute of an input data file may be mapped to a "telephone number" profile attribute that includes data for both area code and phone number.

At 434, one or more validation or cleansing rules may be set up or identified. The validation rules may specify what type of data is valid for the various attributes, and may be used to reject or throw out data that does not comport to the rules. For example, an area code attribute may be required by a rule to be a three digit numeral, while a phone number attribute must be a seven digit numeral. Cleansing rules may be used to format the data being loaded to the profile. For example, cleansing rules may fix the format of dates (e.g., convert months to numbers, such as "March" to "3," or vice versa), convert the first letter of names to upper case, all letters of email addresses to lower case, etc. At 436, once attributes have been mapped and any necessary validation and cleansing rules are set up, the import job may be launched.

Figure 4E:
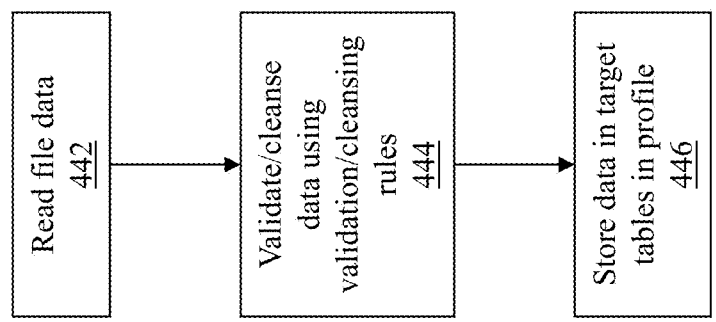
FIG. 4E illustrates a flowchart of a process for running data importation in accordance with some embodiments.

FIG. 4E illustrates a flowchart of a data import runtime process in accordance with some embodiments. At 442, data from the import file is read through the profile adapters associated with the profiles having attributes mapped to the data.

At 444, the data is validated against the one or more specified rules using the profile adapter and the rules processing engine, similar to the validation of survey answers described above, wherein data that does not comply with the rules may be discarded or reformatted. At 446, the remaining data is stored into the target tables in the profiles using the profile adapters.

Figure 5:
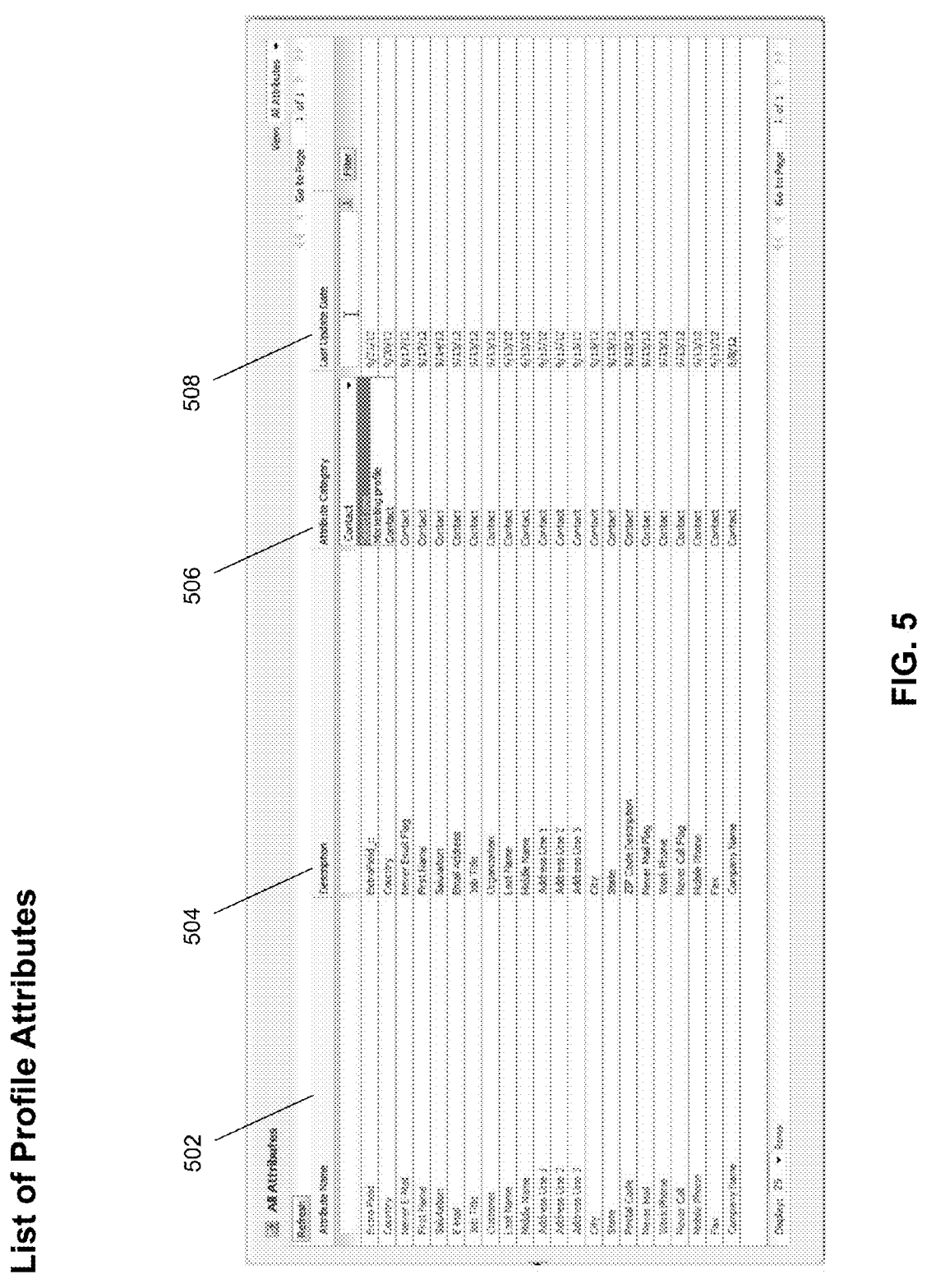
Figure 6:
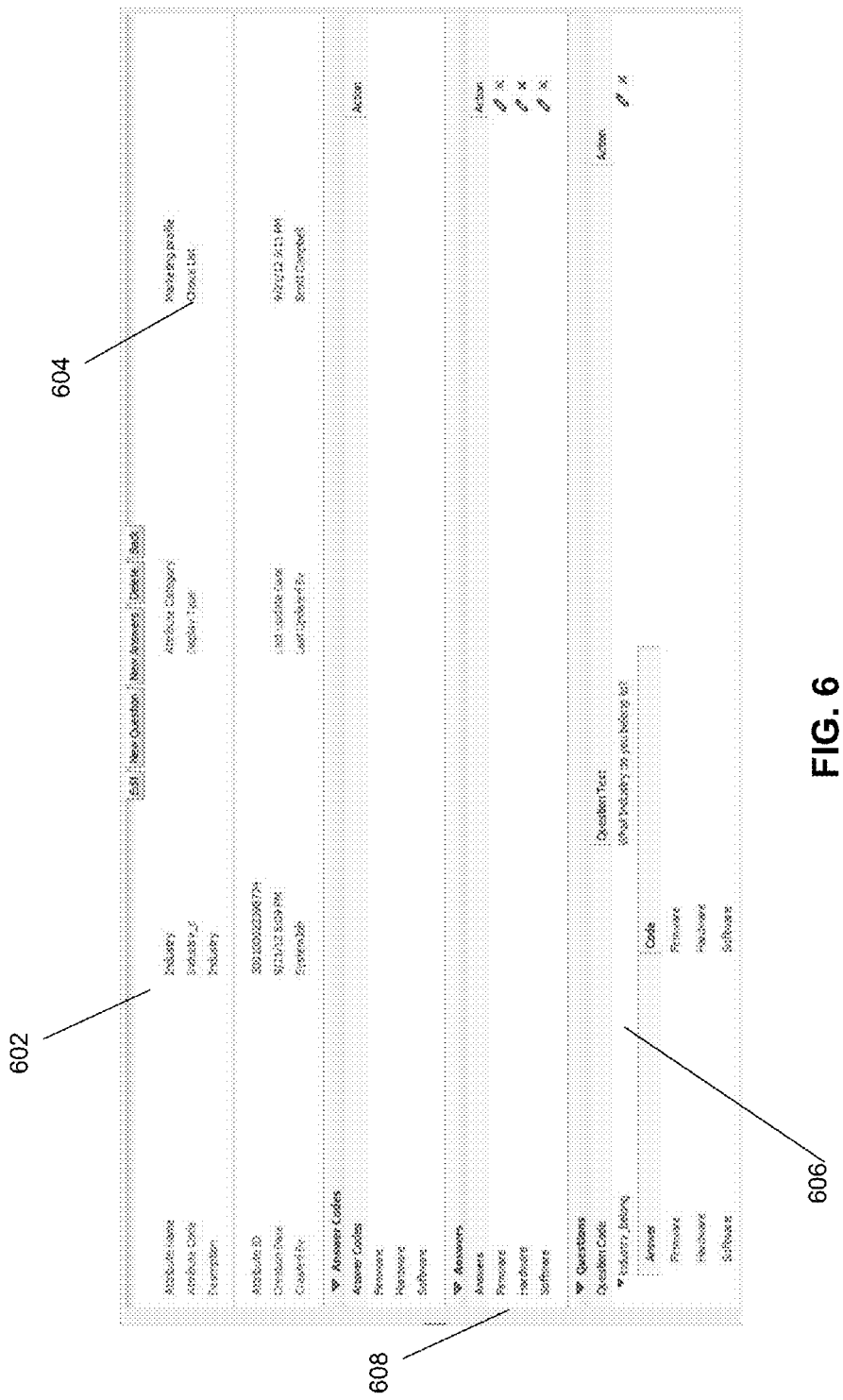
FIG. 6 illustrates an interface that shows example questions that can be used to enter a profile attribute in accordance with some embodiments.
Figure 7:
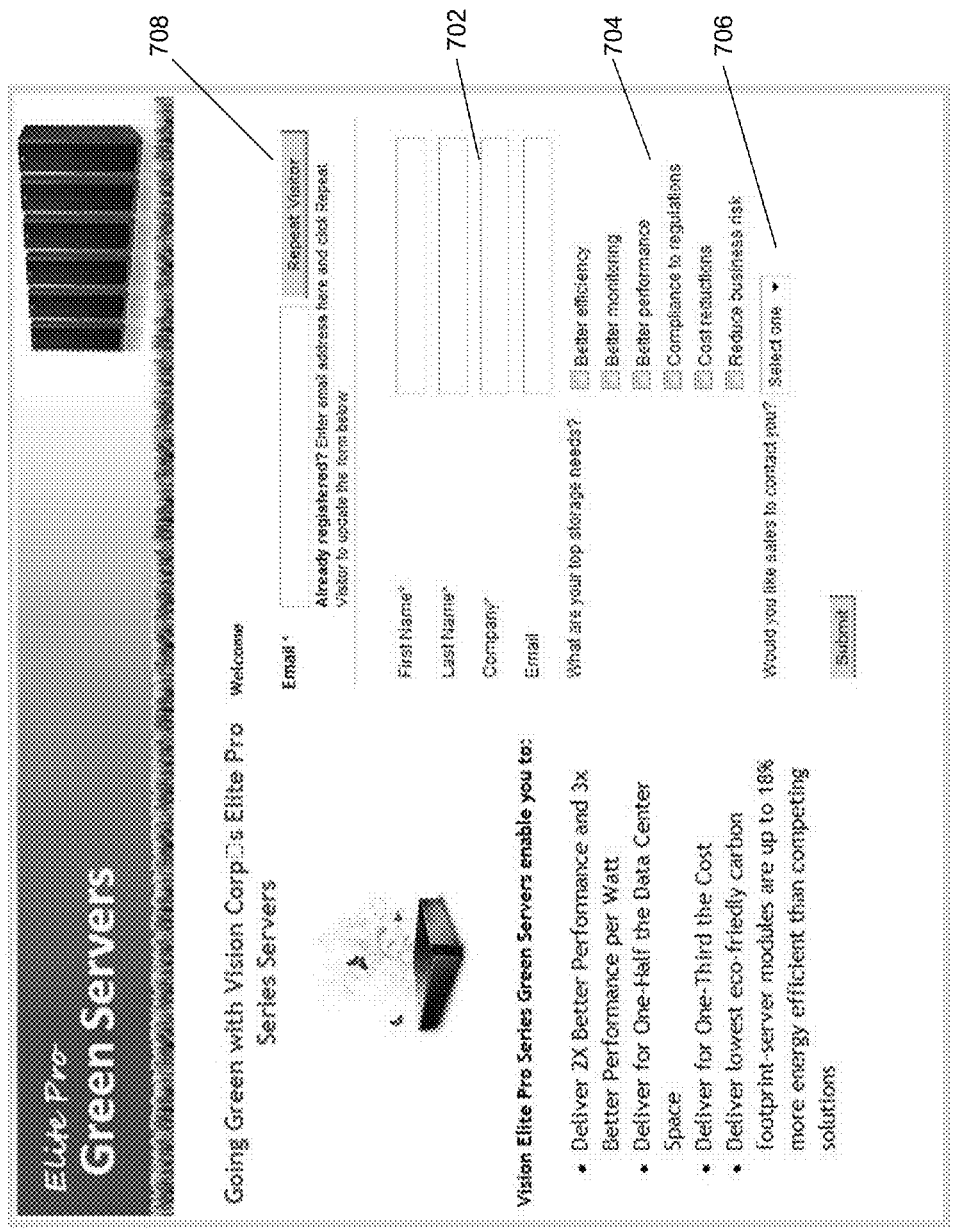
FIG. 7 illustrates an example web page to implement a web survey in accordance with some embodiments.

FIGS. 5-7 illustrate example user interfaces that can be used in some embodiments of the invention. FIG. 5 illustrates an interface that shows a listing of possible attributes for a contact model, along with the attribute description and category. Attributes may have an attribute name 502 and attribute description 504. In some embodiments, the attribute name 502 specifies how the attribute is displayed to users, while the attribute description 504 corresponds to how it is stored in the database. In some embodiments, the interface may be used to define new attributes.

Attribute category 506 may be used to select which profile the attribute is associated with. For example, a "country" attribute is associated with a contact profile. The attribute category 506 may be selected using a drop-down list or other type of interface control. The available categories (profiles) in the drop down menu may be determined by reading the profile metadata with the profile adapter. In some embodiments, the interface may be used to create a new custom object for a new profile if the desired attribute category for an attribute does not yet exist.

Attributes may also have a last update date 508. In some embodiments, this may be used by the rules to determine what questions to ask in a survey. For example, if an attribute has been updated recently, then it may not be necessary to ask the question in a survey, while a question for an attribute that has not been updated recently may be made mandatory for the survey.

FIG. 6 illustrates an interface that shows example questions that can be used in a survey to write to a profile attribute. At 602, one or more attributes may be specified that are to be associated with the question. For example, as illustrated in FIG. 6, the question relates to the "industry" attribute. The attribute may have an associated attribute code and attribute description. The attribute is also associated with an object/profile. For example, the "industry" attribute is associated with the "marketing profile" object.

A display type or format 604 may be specified, which determines how a user will be able to input an answer to the question. In some embodiments, questions may be used with text fields, check boxes, drop-down lists, or other types of interface controls. For example, FIG. 6 illustrates that the question will be displayed with a choice list.

The text for the survey or form question may be specified at 606. The question may be an actual question, as illustrated in the figure, or it may be a label for a text field or interface control (e.g., "Name:" or "Industry:").

In some embodiments, a particular attribute may be limited to certain acceptable values 608. While, some attributes, such as a "first name" attribute, may accept a wide variety of textual inputs, other attributes, such as "state" may only accept a limited number of values. Acceptable values 608 are required for certain display types 604, such as drop-down lists, choice lists, check boxes, etc., where the acceptable values are used to populate the entries of the list for the user to select. For questions where the display type 604 is a text or number field, acceptable values 608 may not need to be defined.

FIG. 7 illustrates an example web page to implement a web survey. This web survey page includes fields that can be populated by a user to enter information in response to the survey questions. For example, FIG. 7 illustrates a plurality of survey questions 702 with text fields for a user to fill in (e.g., "First Name," "Last Name," "Company," etc.). Other questions may receive user answers through one or more checkboxes 704 and/or a drop-down list 706. For example, a "storage needs" attribute for a profile may accept multiple answers. In some embodiments, this may be implemented with a multi-valued answer object, as illustrated in FIG. 3. On the other hand, a "method of contact" attribute may only be able to accept one value out of a plurality of acceptable values, and so is displayed as a drop-down list.

FIG. 7 also illustrates how survey rules may be used to control how survey questions are displayed and handled. For example, if the question 708 for the "email" attribute is answered, the received answer may be used to search for an existing profile, skipping the remainder of the questions if an existing profile with a matching "email" attribute is found.

In some embodiments, a given attribute can have more than one question phrased in different ways catered towards different audience types. Based on the previous responses by a responder, questions with relevant phrasing appear to the responder.

Therefore, what has been described is an improved approach for implementing extensible profiles for enterprise applications. In some embodiments, a profile adapter acts as an interface with various web services for performing operations on the underlying data of the profiles. Users are able to extend their contact model to adapt to changing circumstances and needs, e.g., by adding additional attributes and/or custom objects. The changes are read by the profile adapter, which acts as a single point of contact for web services accessing the profile, insulating them from having to make changes whenever the format of the underlying data is changed or modified. Some embodiments also provide the ability to capture data from various sources, such as web surveys, data imports, and web services and write it to the extended attributes/objects.

System Architecture Overview

Figure 8:
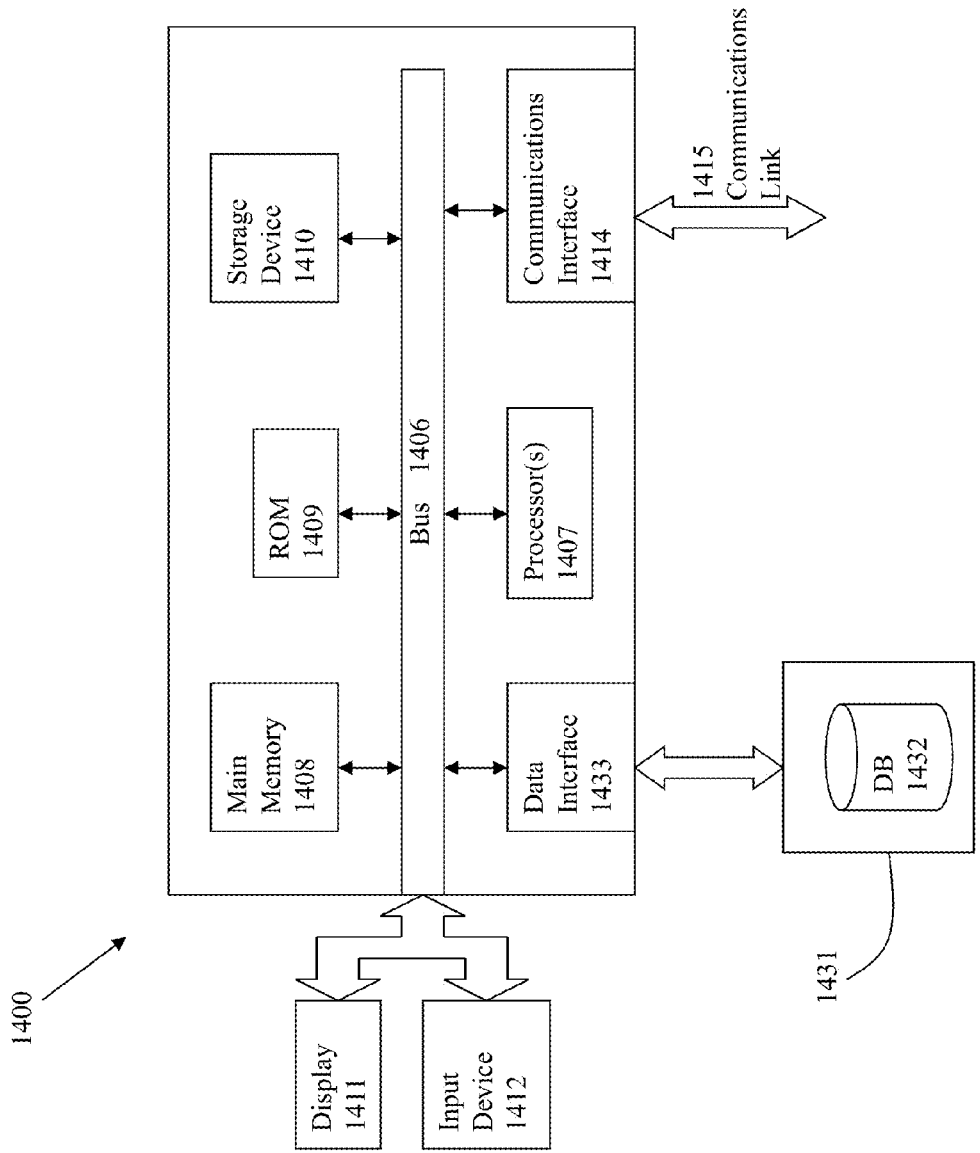
FIG. 8 illustrates a computerized system on which an embodiment of the invention can be implemented.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor for implementing an extensible data structure, comprising:
   maintaining an extensible data structure for access by a web service, the extensible data structure comprising a data model that corresponds to attribute metadata and one or more storage objects, the attribute metadata identifying attributes associated with the data model, the one or more storage objects implemented as one or more entries in a set of database tables that hold data for each of the attributes identified by the attribute metadata, where the data model is extensible with a new attribute by adding the new attribute to the attribute metadata with a mapping from the attribute metadata to a storage object corresponding to an entry in the set of database tables to hold the data for the new attribute;
   providing an adaptor to interface between the web service and the extensible data structure, the adaptor using the attribute metadata to access the data for the attributes in the data model that are stored within the entries in the set of database tables, where the web service is insulated from a requirement for updating when the data model is updated since the web service accesses the data model through the adaptor;

using the adapter to access a first or second versions of the data model, wherein the adapter comprises logic, such that external entities read and write data from a first version of the data model or a second version of the data model, corresponds to a set of rules that operates in conjunction with a rules engine and the adapter is applicable to multiple profiles;

providing information accessed by the adapter to an external data source or a web service;

detecting the object or the attribute for the second data model using the adapter;

implementing objects as entries in a set of underlying database tables, wherein multiple database tables may be joined for each object, wherein the one or more attributes map to underlying data object, further comprising detecting the object or the attribute for the second data model using the adapter; wherein the object is definable and extendable by modifying the metadata, wherein the metadata comprises the first version of the data model or the second version of the data model and one or more attributes of the first version of the data model or the second version of the data model; wherein the data object further comprises data from at least one of surveys, data imports, and web services and the data is validated using a set of rules, and wherein a software application comprises a CRM application, and the object corresponds to data about a marketing or sales contact;

extending, using a server computing system, a first version of the data model into a second version of the data model, the second version of the data model comprising the new attribute that either does not exist in the first version of the data model or is changed from the first version of the data model, the attribute metadata being configured to specify the new attribute for the second version of the data model; and the web service being associated with a software application uses the adapter to access the first or second versions of the data model instead of the web service associated with the software application directly accessing the first or second versions of the data model.

2. The method of claim 1, wherein the object is definable and extendable by modifying the metadata.

3. The method of claim 1, wherein the metadata comprises the first version of the data model or the second version of the data model and one or more attributes of the first version of the data model or the second version of the data model, wherein one or more attributes map to underlying data object.

4. The method of claim 1, further comprising
detecting the object or the attribute for the second data model using the adapter.

5. The method of claim 3, wherein the adapter comprises logic, such that external entities read and write data from the first version of the data model or the second version of the data model.

6. The method of claim 1, wherein the adapter is applicable to multiple profiles.

7. The method of claim 1, in which the adapter corresponds to a set of rules that operates in conjunction with a rules engine.

8. The method of claim 1, in which the software application comprises a CRM application, and the object corresponds to data about a marketing or sales contact.

9. The method of claim 1, wherein the object comprises data from at least one of surveys, data imports, and web services and the data is validated using a set of rules.

10. A non-transitory computer readable medium having stored thereon a sequence of instructions which, when executed by a processor causes the processor to execute a method for implementing an extensible data structure, the method comprising:

maintaining an extensible data structure for access by a web service, the extensible data structure comprising a data model that corresponds to attribute metadata and one or more storage objects, the attribute metadata identifying attributes associated with the data model, the one or more storage objects implemented as one or more entries in a set of database tables that hold data for each of the attributes identified by the attribute metadata, where the data model is extensible with a new attribute by adding the new attribute to the attribute metadata with a mapping from the attribute metadata to a storage object corresponding to an entry in the set of database tables to hold the data for the new attribute;

providing an adaptor to interface between the web service and the extensible data structure, the adaptor using the attribute metadata to access the data for the attributes in the data model that are stored within the entries in the set of database tables, where the web service is insulated from a requirement for updating when the data model is updated since the web service accesses the data model through the adaptor;

using the adapter to access a first or second versions of the data model, wherein the adapter comprises logic, such that external entities read and write data from a first version of the data model or a second version of the data model, corresponds to a set of rules that operates in conjunction with a rules engine and the adapter is applicable to multiple profiles;

providing information accessed by the adapter to an external data source or a web service;

detecting the object or the attribute for the second data model using the adapter;

implementing objects as entries in a set of underlying database tables, wherein multiple database tables may be joined for each object, wherein the one or more attributes map to underlying data object, further comprising detecting the object or the attribute for the second data model using the adapter; wherein the object is definable and extendable by modifying the metadata, wherein the metadata comprises the first version of the data model or the second version of the data model and one or more attributes of the first version of the data model or the second version of the data model; wherein the data object further comprises data from at least one of surveys, data imports, and web services and the data is validated using a set of rules, and wherein a software application comprises a CRM application, and the object corresponds to data about a marketing or sales contact;

extending, using a server computing system, a first version of the data model into a second version of the data model, the second version of the data model comprising the new attribute that either does not exist in the first version of the data model or is changed from the first version of the data model, the attribute metadata being configured to specify the new attribute for the second version of the data model; and the web service being associated with a software application uses the adapter to access the first or second versions of the data model instead of the web service associated with the software application directly accessing the first or second versions of the data model.

11. The non-transitory computer readable medium of claim 10, wherein the object is definable and extendable by modifying the metadata.

12. The non-transitory computer readable medium of claim 10, wherein the metadata comprises the first version of the data model or the second version of the data model and one or more attributes of the first version of the data model or the second version of the data model, wherein one or more attributes map to underlying data of the object.

13. The non-transitory computer readable medium of claim 10, further comprising detecting the object or the attribute for the second data model using the adapter.

14. The non-transitory computer readable medium of claim 12, wherein the adapter comprises logic enabling external entities to read and write data from the first version of the data model or the second version of the data model.

15. The non-transitory computer readable medium of claim 10, wherein the adapter is applicable to multiple profiles.

16. The non-transitory computer readable medium of claim 10, in which the adapter corresponds to a set of rules that operates in conjunction with a rules engine.

17. The non-transitory computer readable medium of claim 10, in which the software application comprises a CRM application, and the object corresponds to data about a marketing or sales contact.

18. The non-transitory computer readable medium of claim 10, wherein the object comprises data from at least one of surveys, data imports, and web services and the data is validated using a set of rules.

19. A system for implementing an extensible data structure, comprising:
  a processor;
  a memory comprising a computer code executed using the processor, in which the computer code implements maintaining an extensible data structure for access by a web service, the extensible data structure comprising a data model that corresponds to attribute metadata and one or more storage objects, the attribute metadata identifying attributes associated with the data model, the one or more storage objects implemented as one or more entries in a set of database tables that hold data for each of the attributes identified by the attribute metadata, where the data model is extensible with a new attribute by adding the new attribute to the attribute metadata with a mapping from the attribute metadata to a storage object corresponding to an entry in the set of database tables to hold the data for the new attribute;
  providing an adaptor to interface between the web service and the extensible data structure, the adaptor using the attribute metadata to access the data for the attributes in the data model that are stored within the entries in the set of database tables, where the web service is insulated from a requirement for updating when the data model is updated since the web service accesses the data model through the adaptor;
  using the adapter to access a first or second versions of the data model, wherein the adapter comprises logic, such that external entities read and write data from a first version of the data model or a second version of the data model, corresponds to a set of rules that operates in conjunction with a rules engine and the adapter is applicable to multiple profiles;
  providing information accessed by the adapter to an external data source or a web service;
  detecting the object or the attribute for the second data model using the adapter; and
  implementing objects as entries in a set of underlying database tables, wherein multiple database tables may be joined for each object, wherein the one or more attributes map to underlying data object, further comprising detecting the object or the attribute for the second data model using the adapter; wherein the object is definable and extendable by modifying the metadata, wherein the metadata comprises the first version of the data model or the second version of the data model and one or more attributes of the first version of the data model or the second version of the data model; wherein the data object further comprises data from at least one of surveys, data imports, and web services and the data is validated using a set of rules, and wherein a software application comprises a CRM application, and the object corresponds to data about a marketing or sales contact;
  extending, using a server computing system, a first version of the data model into a second version of the data model, the second version of the data model comprising the new attribute that either does not exist in the first version of the data model or is changed from the first version of the data model, the attribute metadata being configured to specify the new attribute for the second version of the data; and
  the web service being associated with a software application uses the adapter to access the first or second versions of the data model instead of the web service associated with the software application directly accessing the first or second versions of the data model.

20. The system of claim 19, wherein the object is definable and extendable by modifying the metadata.

21. The system of claim 19, wherein the metadata comprises the first version of the data model or the second version of the data model and one or more attributes of the first version of the data model or the second version of the data model, wherein one or more attributes map to underlying data of the object.

22. The system of claim 19, detecting the object or the attribute for the second data using the adapter.

23. The system of claim 21, wherein the adapter comprises logic enabling external entities to read and write data from the first version of the data model or the second version of the data model.

24. The system of claim 19, wherein the adapter is applicable to multiple profiles.

25. The system of claim 19, in which the adapter corresponds to a set of rules that operates in conjunction with a rules engine.

26. The system of claim 19, in which the software application comprises a CRM application, and the object corresponds to data about a marketing or sales contact.

27. The system of claim 19, wherein the object comprises data from at least one of surveys, data imports, and web services and the data is validated using a set of rules.

* * * * *

UNITED STATES PATENT AND TRADEMARK OFFICE
CERTIFICATE OF CORRECTION

PATENT NO. : 9,704,168 B2
APPLICATION NO. : 14/040515
DATED : July 11, 2017
INVENTOR(S) : Chauhan et al.

Page 1 of 1

It is certified that error appears in the above-identified patent and that said Letters Patent is hereby corrected as shown below:

In the Drawings

On sheet 1 of 12, in FIG. 1, under Reference Numeral 102b, Line 5, Delete "Opptunity" and insert -- Opportunity --, therefor.

Signed and Sealed this
Thirteenth Day of February, 2018

Andrei Iancu
*Director of the United States Patent and Trademark Office*